United States Patent [19]
Smith

[11] Patent Number: 4,480,966
[45] Date of Patent: Nov. 6, 1984

[54] APPARATUS FOR CONVERTING THE SURFACE MOTION OF A LIQUID BODY INTO USABLE POWER

[75] Inventor: William W. Smith, Cupertino, Calif.

[73] Assignee: Octopus Systems, Inc., San Jose, Calif.

[21] Appl. No.: 552,845

[22] Filed: Nov. 16, 1983

Related U.S. Application Data

[63] Continuation of Ser. No. 287,890, Jul. 29, 1981.

[51] Int. Cl.³ .............................................. F03B 13/12
[52] U.S. Cl. ...................................... 417/332; 60/496; 60/500; 60/501; 60/504
[58] Field of Search ...................... 417/331, 332, 333; 60/496, 497, 498, 500, 501, 504, 506

[56] References Cited
U.S. PATENT DOCUMENTS 1,502,511  7/1924  Marvin .
4,206,434  6/1980  Eberle ............................ 60/497 X
4,345,434  8/1982  Nedyalkov ........................... 60/398

Primary Examiner—Richard E. Gluck
Attorney, Agent, or Firm—Flehr, Hohbach, Test Albritton & Herbert

[57] ABSTRACT

Apparatus for converting wave motion at the surface of a supporting medium into usable power and including a buoyant main body 24 forming a housing for a plurality of pumps 30 and a float system 28 connected thereto such that wave induced relative motion between the body 24 and the component parts of the float system 28 causes actuation of the pumps 30. The pumps 30 intake water from the supporting medium and pumps it through an effluent conduit 12 to a remote location 16 where it is used to perform useful work. The apparatus can be scuttled during storms, with effective resurrection made possible by using the buoys of the float system to store air, or other fluid, under pressure until needed to purge the buoyant main body of water.

22 Claims, 11 Drawing Figures

U.S. Patent  Nov. 6, 1984  Sheet 1 of 7  4,480,966
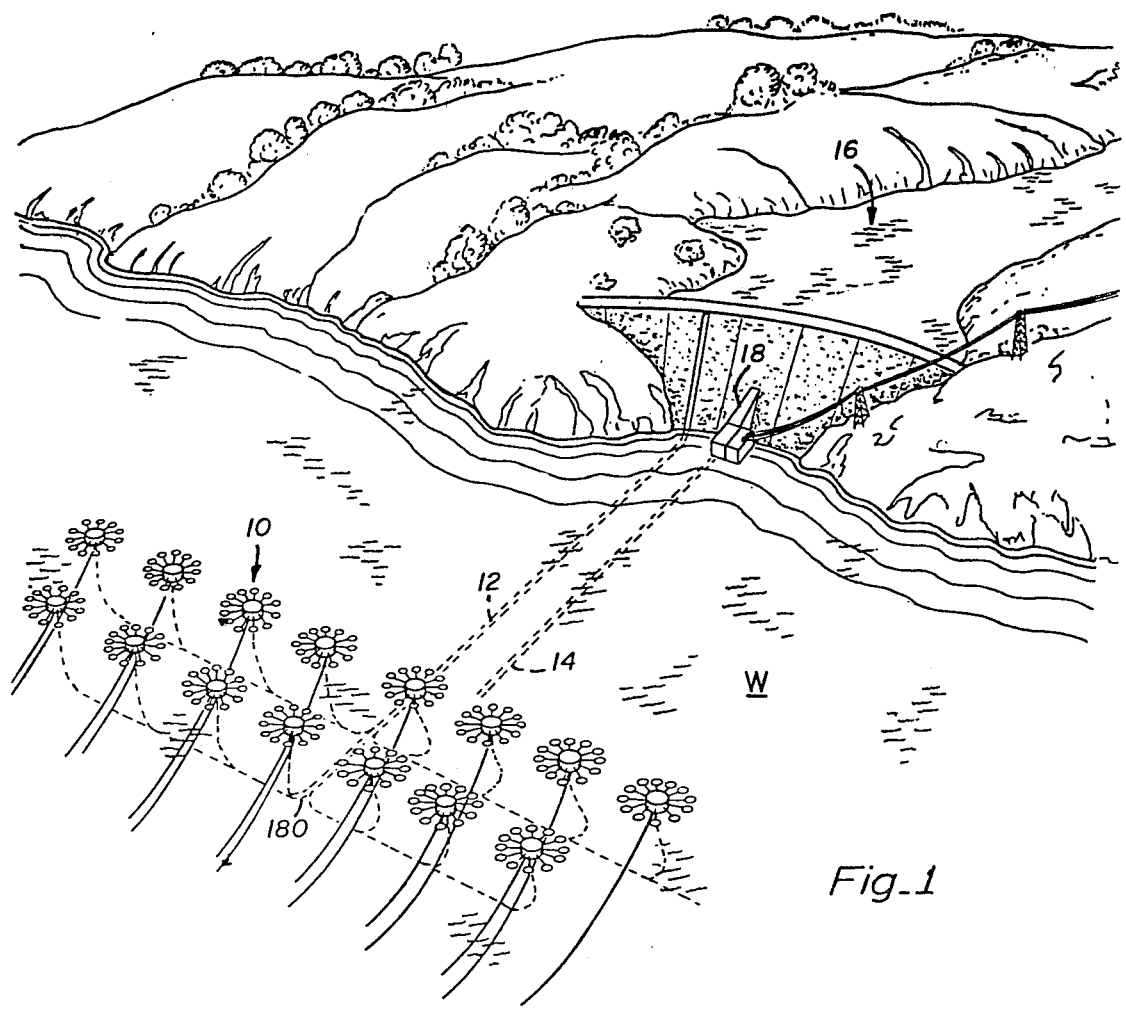
Fig_1
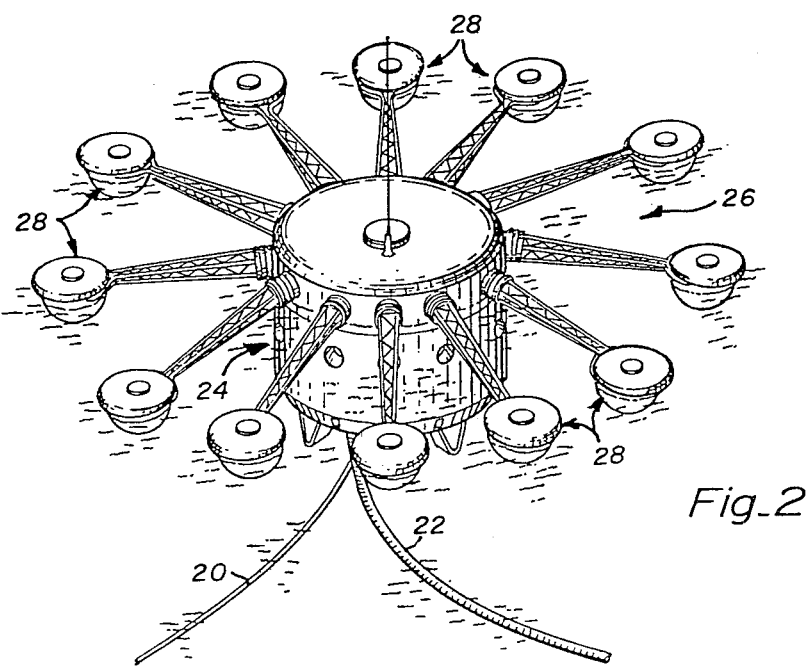
Fig_2

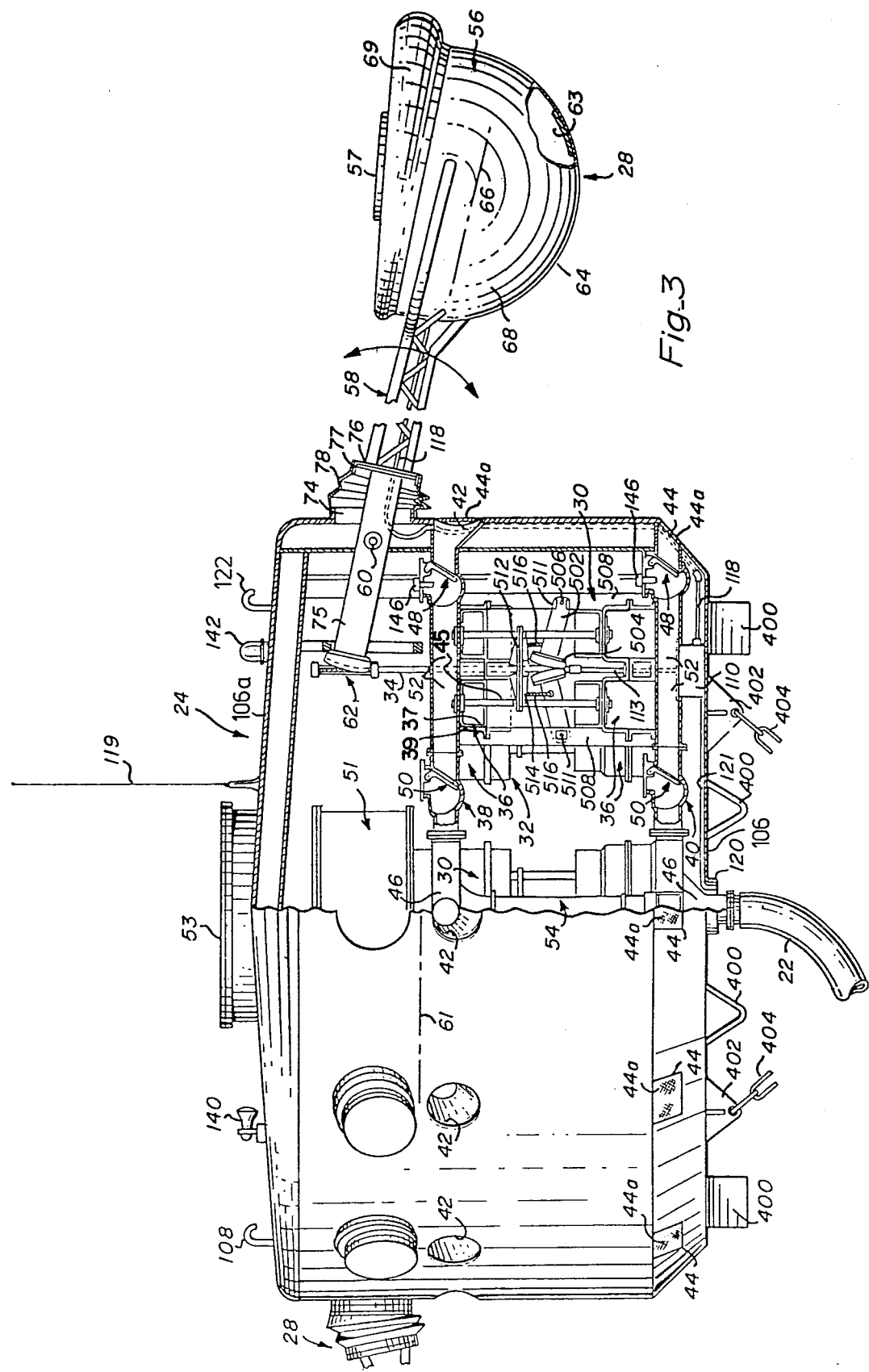

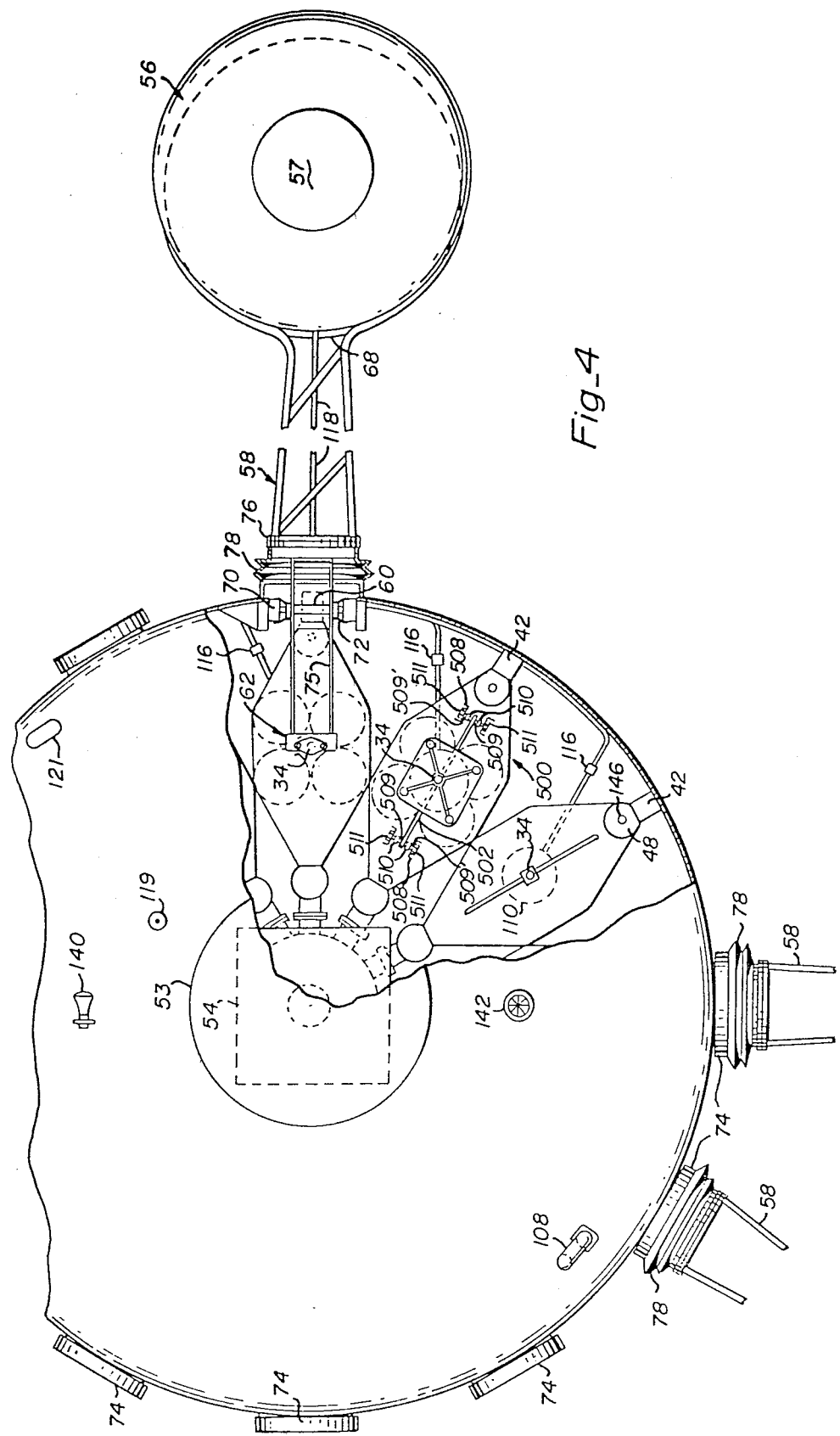
Fig_4

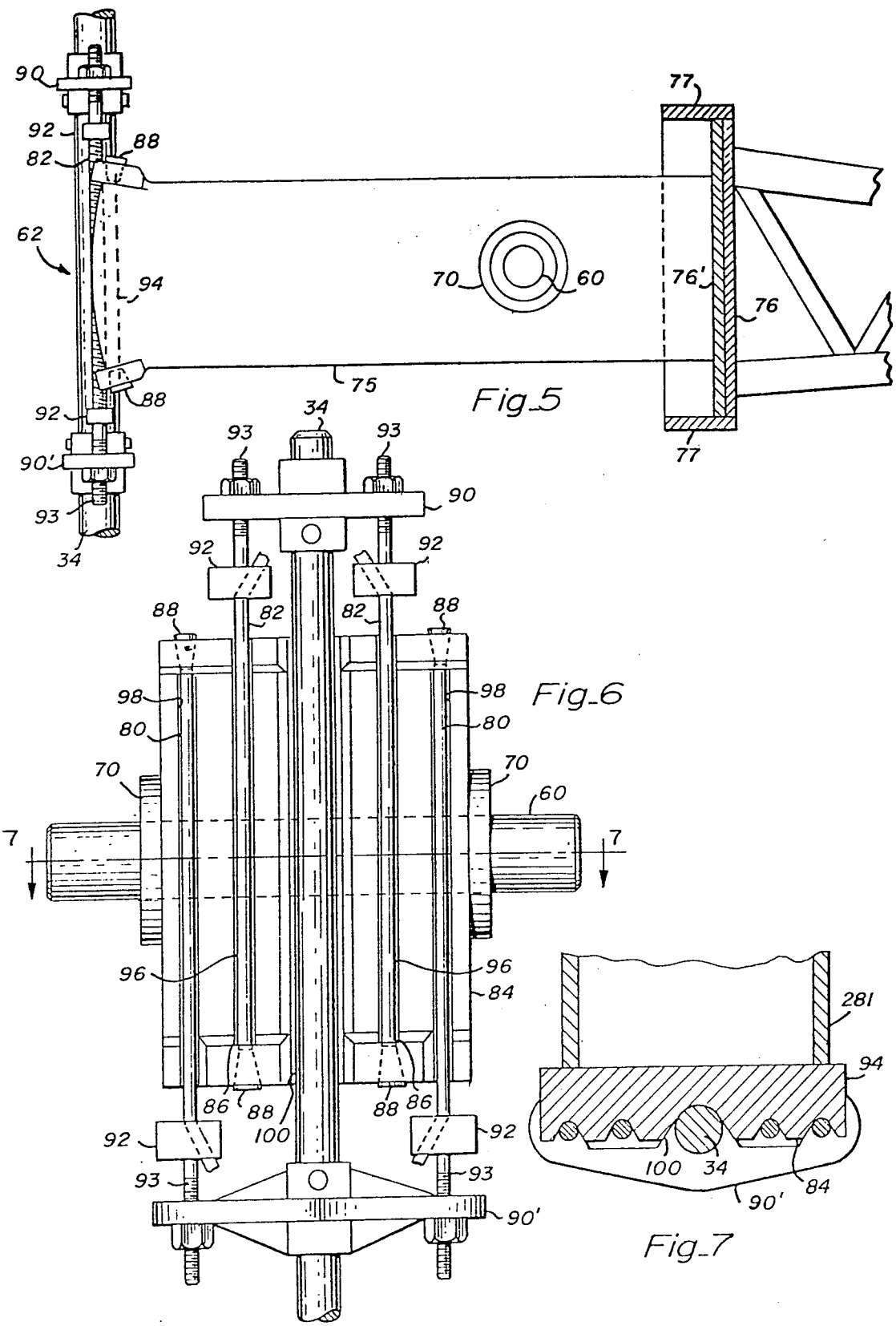

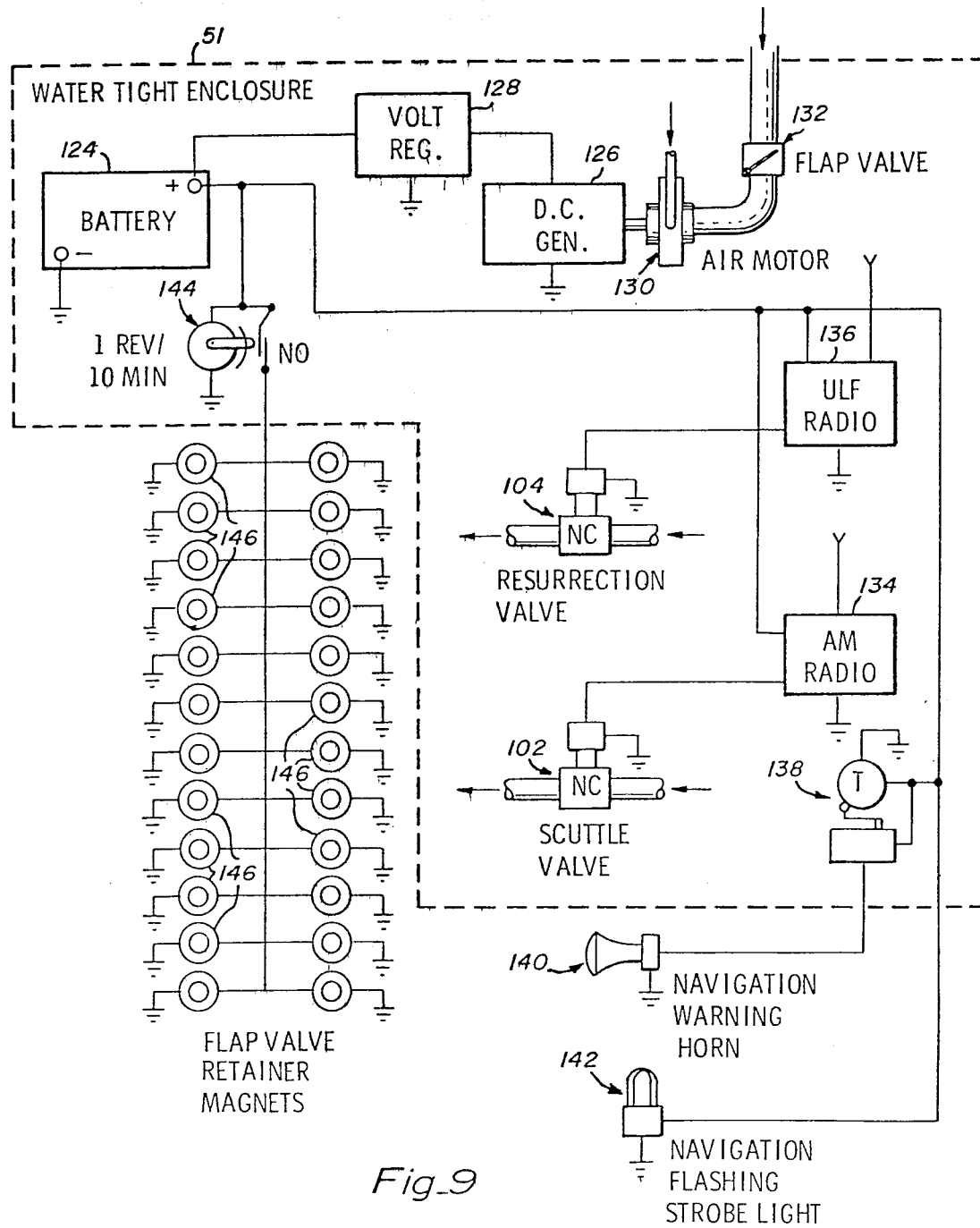
Fig_9

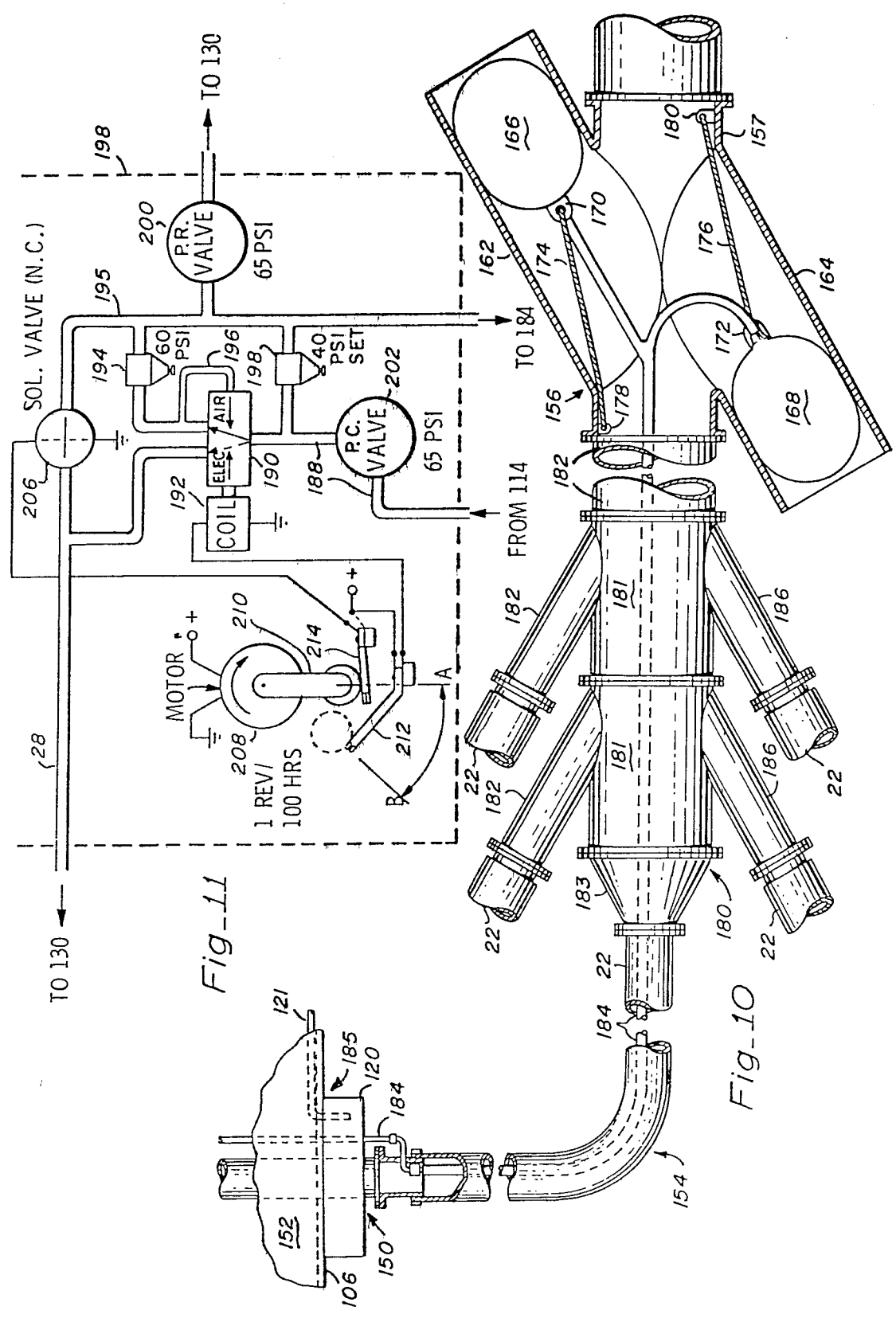

APPARATUS FOR CONVERTING THE SURFACE MOTION OF A LIQUID BODY INTO USABLE POWER

This is a continuation of application Ser. No. 287,890, filed July 29, 1981.

BACKGROUND OF THE INVENTION

1. Field of the Invention

The present invention relates generally to a liquid body surface motion converting device, and more specifically to a floating wave-powered pump capable of converting random surface energy, as found in oceans, and the like, into a useful energy source.

2. Description of the Prior Art

It has long been desired to harness the wave and other energy forms found in ocean and other large bodies of water. One approach to the problem is to arrange a wave-actuated mechanism at or in the body of water, the output of which mechanism actuates an electrical generator associated with the mechanism. An example of such a device can be found in U.S. Pat. No. 2,477,691, issued Aug. 2, 1949, to E. M. Griffin, wherein levers mounted on a barge for vertical swinging motion have a float provided at an outboard end and are connected to a piston rod of an air compressor at an inboard end so as to compress air due to relative motion between the float and barge. The compressed air is used to power electrical generators disposed below decks of the barge. Such an arrangement, however, is inefficient and unsuitable for large scale operations due to size limitations on the generations and losses encountered in using compressed air.

Another approach has been proposed wherein wave motion is used to pump water to a reservoir at a location higher than the water surface level so that the elevated water can be passed downwardly through hydraulic turbines and back to the body of water from which it was pumped. An example of this approach can be found in U.S. Pat. No. 4,132,901, issued Jan. 2, 1979, to D. Crousbay.

Devices proposed for pumping water to a reservoir fall in three basic classes, two of which are closely related in that they both provide a buoy or float on a vertically swinging arm disposed outboard of a support on which the arm is mounted. The support can either be mounted on the floor of the body of water so as to be fixed in position relative thereto, or can be floating on the water and tethered to the floor of the body of water or to the adjacent shore.

U.S. Pat. Nos. 970,048, issued Sept. 13, 1910, to N. O. Harmon, and 4,171,189, issued Oct. 16, 1979, to G. Schreiber, disclose apparatus supported on the bottom of a body of water, but extend above the surface of the water so that the associated float or floats move a swing arm which is pivoted above the water. U.S. Pat. Nos. 4,023,515, issued May 17, 1977, to L. C. Tharaldson, and 4,092,828, issued June 6, 1978, to R. M. Garza, are similar in that they disclose floor supported overhead structures but provide a platform from which a plurality of swing arms and floats are extended. One disadvantage of these arrangements relates to the difficulty of providing height adjustment for the supports so as to accommodate variations in water level due to tide changes. The necessary structure for this purpose tends to clog and become corroded. More importantly, these support arrangements have difficulty in withstanding storms due to their exposed positions above water level.

Accordingly, arrangements have been proposed wherein the entire support structure is disposed under water in order to protect it from storm damage, with the swing arm also being under water and only the float itself projecting above the water surface. Examples of this arrangement can be found in U.S. Pat. Nos. 3,970,415, issued July 20, 1976, to K. Widcrantz, et al.; 4,111,610, issued Sept. 5, 1978, to H. C. Brown; and 4,163,633, issued Aug. 7, 1979, to J. A. Vriend. U.S. Pat. No. 3,289,415, issued Dec. 6, 1966, to G. E. Merrill, discloses a pump of the class specifically intended for the rather unique purpose of transporting water from melting icebergs which are themselves transported to arid areas from polar regions.

Among the disadvantages to this approach, however, is that placing the swing arm under water decreases the efficiency of operation of the device as compared to apparatus having its swing arm(s) disposed above water level. Further, much of the structure is still disposed dangerously near the water surface during storms.

U.S. Pat. No. 4,125,346, issued Nov. 14, 1978, to W. H. Pickle, discloses a floating support arrangement on which a plurality of swing arm and float assemblies are disposed. The support slides up-and-down with the tides on vertical posts. However, such arrangements are subject to binding problems thereby making the system susceptible to storm damage.

Another floating support arrangement is disclosed in U.S. Pat. No. 4,105,368, issued Aug. 8, 1978, to F. L. Waters. This device uses a floating, tethered vessel having connected thereto and radially extending therefrom a plurality of floating buoys pivotally connected to the vessel by swing arms which actuate pumps that force a hydraulic fluid from a sump reservoir to pressure accumulators on board the vessel. The pressurized fluid can then be tapped as needed to provide a source of power. This is a low volume set-up similar to those generating electricity on board a float or support, and has similar disadvantages to such arrangements.

In addition, the arrangement discussed immediately above, as well as most of the other devices mentioned, have the further disadvantage of not being able to develop power on both the up and down movements of the float and arm. On the down stroke, the weight of the float would have to equal the buoyancy of the float, an impractical situation.

Finally, the third class of devices uses a pair of similar floats connected together to form a pump. For example, U.S. Pat. No. 4,076,464, issued Feb. 28, 1978, discloses a dual wave motion pump in which a pair of floating bodies are linked by a lever whose motion serves to initiate and multiply the pumping energy of each of the bodies. This arrangement, however, is somewhat limited in volume, and would require a very large number of units to fill a hydroelectric reservoir, or the like.

U.S. Pat. No. 3,603,804, issued Feb. 16, 1979, to J. M. Casey, discloses a paired float arrangement using a pipe structure forming a horizontal axis to support the float pairs. The floats have a maximum sectional area at the water line thereof so as to enhance response to wave action and facilitate oscillation about their respective pivot axes. The unit is disclosed as being sinkable by remote control and subsequently raised to avoid storm damage.

SUMMARY OF THE PRESENT INVENTION

It is an object of the present invention to provide a wave energy conversion device capable of being used in an efficient and reliable manner to extract energy from waves and use that energy to pump water or other liquid from a body of same to an elevated reservoir to be converted into usable energy, to a desalination or other purification apparatus, or to a discharge location to flush migratory, nuisance sand from a harbor containing the water.

It is another object of the present invention to provide a wave motion pump which is capable of creating a high volume flow, while being highly resistent to abrasion due to sliding and turning parts.

Still another object of the present invention is to provide a double action pump arrangement having a float construction which enables the downward motion to create forces equal to the buoyant upward motion forces.

A still further object of the present invention is to provide a wave motion converting device which is made relatively safe from storm damage by the inclusion of a scuttling provision having an effective resurrection feature.

Yet another object of the present invention is to provide a wave motion device that is omni-directional in that it will function in cross waves, shore aligned waves, swells or turbulent sea surface, and the like.

These and other objects are achieved according to the present invention by providing a wave motion powered pump apparatus including a buoyant main body portion, a float system including multiple floats connected to the body portion by elongated arms which permit relative movement between the several floats and the body portion under the influence of wave or swell motion of the supporting liquid, and a pump arrangement including a plurality of pumps housed within the body portion and connected to the float assembly by the arms such that the second pumps are actuated by movement of the floats relative to the body portion due to wave or swell action and thereby cause a controlled flow of liquid to be forced through a suitable conduit to a remote site to be converted into useful work.

The device includes a scuttle and resurrection system for permitting the device to be scuttled and sunk to the bottom of the supporting of liquid when excessive and potentially damaging wind and wave action is expected.

A backflush valve assembly is disposed in the discharge manifold system outboard of the body portion for permitting particulate accummulations to be flushed from the system.

Suitable electrical and pneumatic control systems are provided within the body portion for controlling the operation of the scuttle and resurrection arrangement preferably being actuated from a remote location and a backflush valve assembly preferably actuated by a timer meter within the unit.

IN THE DRAWINGS

FIG. 1 is a diagrammatic, perspective view showing how apparatus according to the present invention can be used to pump water to a reservoir to be converted into more useful energy;

FIG. 2 is a diagrammatic, perspective view showing a single apparatus according to the present invention;

FIG. 3 is a side elevational view, partly in vertical section, showing the apparatus of FIG. 2;

FIG. 4 is a top plan view showing the apparatus seen in FIG. 3;

FIG. 5 is an enlarged, side elevational, detail view showing a swing arm to pump connection according to the invention;

FIG. 6 is an elevational view looking from the left in FIG. 5;

FIG. 7 is a sectional view taken generally along the line 7—7 of FIG. 6;

FIG. 9 is a schematic diagram showing an electrical control circuit for use with the fluid circuit of FIG. 8;

FIG. 10 is a schematic diagram, partially cut away and in section, showing a backflush valve system in the discharge manifold of apparatus according to the present invention; and FIG. 11 is a schematic diagram showing a control circuit for the backflush valve system of FIG. 10.

DESCRIPTION OF THE PREFERRED EMBODIMENTS

Figure 8:
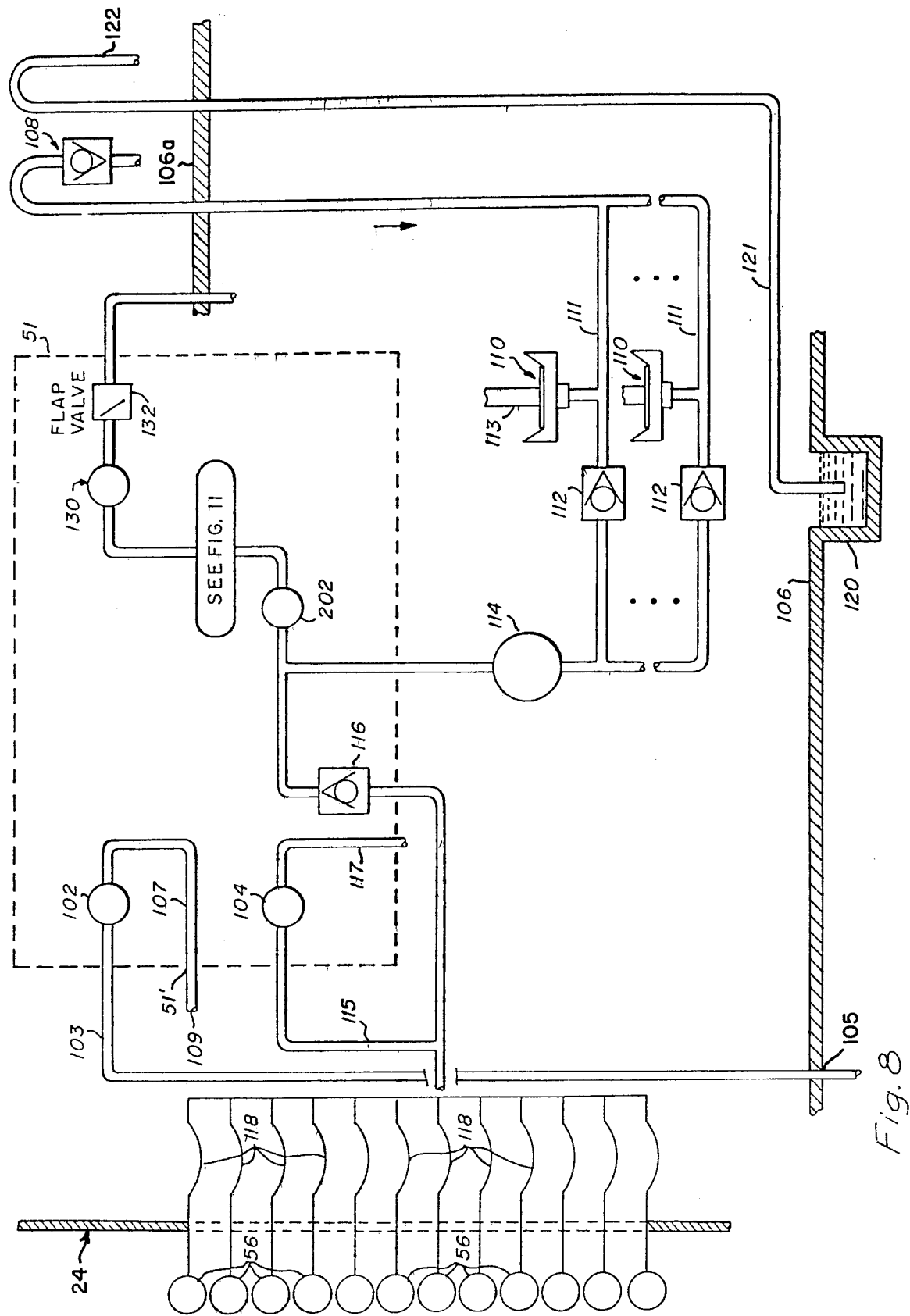
FIG. 8 is a schematic diagram showing a fluid control circuit for use with the present invention.

Referring now to FIG. 1 of the drawing, a group of wave motion powered pump devices 10 according to the present invention are coupled (grouped) together to pump water via pipes 12 and 14 to an elevated reservoir 16 from which it can fall to a hydroelectric power plant in order to generate electricity. A system of the type illustrated could also be used to generate power for desalinating salt water, to provide a purging flow of water for removing sand and sediment from harbors, and to perform other such functions.

As can be seen from FIGS. 2 through 4 of the drawings, each device 10 is tethered by a line 20 connected to a suitable mooring (not shown) such as a large piece of concrete, so as to be retained in a desired position in a body of water W. A pipe or other suitable conduit 22 leading from the bottom of each device 10 permits pumped water to be transported from the devices 10 to large trunk lines, such as the pipes 12 and 14 in FIG. 1.

Each device 10 is comprised of a buoyant main body portion 24 which floats in water W as illustrated and an outrigged float system 26. The float system 26, including a plurality of float assemblies 28, is connected to the main body 24 and likewise floats in water W moving up and down relative to body 24 under the influence of wave action. The float assemblies 28 are arranged around and disposed to extend radially from body 24, such that body 24 can be considered a "mother vessel" for the float assemblies 28.

Disposed on a lower surface of body 24 are feet 400 which help support body 24 on a bottom (not show) of water when body 24 is scuttled. Arranged on the same surface adjacent feet 400 are thether bridle anchors 402 which permit connection to body 24 of chains 404 forming a tether bridle system attached to line 20 for mooring body 24 in a desired location.

Pump systems 30, associated with each float assembly 28, are disposed within body 24 and are actuated individually by movement of the float assemblies 28 relative to the body 24. Each pump system 30 includes at least one double acting reciprocating pump unit 32, and preferably a plurality of such pumps units. Each pump assembly 30 includes a rod 34 mounted for reciprocation by an associated float assembly 28, and at least a pair of opposed "rolling diaphragm" type pistons 36 are attached to each rod 34 for reciprocating movement therewith. Each pumping unit is comprised of a piston 36 and a cylindrically configured diaphram 37 which is affixed at its center to a piston 36 and at its periferal extremities to the cylinder wall 39. A substantial gap is provided between the cylinder wall, or housing 39 of the pump 32 and its piston 36 so as to reduce wear which can be caused by sand and other particulate matter that might find its way into the pump.

A pair of spaced headers 38 and 40, each having a respective inlet 42 and 44 and an outlet 46, bracket the pistons 36 top and bottom, such that one of the headers 38, 40 is in communication with a respective piston 36. Inlet check valves 48 and outlet check valves 50 are arranged in headers 38, 40 adjacent inlets 42, 44 and outlets 46, respectively, to form compression chambers 52 in communication with pumps 36.

Each pump assembly is preferably comprised of two sets of pumping chambers having a plurality of opposed pairs of pistons 36 arranged in parallel and connected to a common rod 34 so as to be simultaneously driven thereby. As illustrated, each pump assembly 30 is comprised of four pairs of pistons 36.

Each inlet 42 and 44 are covered by a screen 44a to prevent pieces of sea debris from entering the pumps.

The pump systems 30 further include a discharge manifold 54 disposed within body 24 and connected to the outlets 46 of headers 38, 40 for receiving water flowing from the pump units 32 and for directing the water along a common path to the discharge pipe 22.

A lower guide swing arm assembly 500 is provided to guide rod 34 of the pump 32. Assembly 500 includes a pair of cooperating swing cranks 502 each terminating in a head 504 forming a curved channel arranged for receiving the rod 34. The cranks 502 are pivotally mounted on a pivot pin 506 disposed to extend between a pair of brackets 508 which are attached to a suitable part of body 24. Bearings 509, 509' journal cranks 502 on pin 506 and pin 506 on brackets 508. Boots 510 are arranged on the pin 506 by mounting on bearings 509, 509' on either side of the associated swing crank 502 to seal the pivot joint against contamination. Plates 511 are provided with gaskets abutting the outer surfaces of associated brackets 508 to which the plates 511 are bolted, or otherwise attached to further assure that sea water is kept from the axle bearings and other lubricated surfaces.

Permanently sandwiched plates 512 and 514 are affixed to all of the rods 34 of a pump unit 32 at a point above assembly 500 to form a free distribution member for coupling energy from the rod 34 to the four piston rods 45 which connect the four pistons 36 in the top pumping cluster to the four pistons 36 in the bottom pumping cluster.

Cable 516 can be provided for supporting cranks 502 from plates 512, 514 so as to prevent downward free-fall of the cranks.

Disposed within the body 24 is a sealed compartment 51 which houses the electrical controls and certain system valving as will be further described below relative to FIGS. 8 and 9. Access to the interior of body 24 is had through a sealed "man hole" cover 53.

Each float assembly 28 includes a buoy 56 having an access hatch 57 on the upper surface thereof to permit access to the hollow interior of the buoy 56 for maintenance purposes. An arm 58 is attached at one end to buoy 56, and is pivotally connected to body 24 at a point spaced from the buoy 56 by a fulcrum pin 60 for pivotal movement about a horizontal axis. Fulcrum pin 60 is journalled to the body 24 so that its pivot axis is substantially parallel to the water line 61 of body 24. A linkage 62 is attached to the interior end of arm 58 and is connected to the associated pump rod 34 for causing a vertical swinging motion of arm 58 to operate the associated pump units 32.

Buoy 56 is loaded with weights 63 so that in falling, it exerts a downward force substantially equal to the upward force applied to the buoy by wave action. Buoy 56 has a rounded bottom surface 64 and a normal waterline 66. The periphery 68 of buoy 56 is curved, or rounded, from surface 64 to the water line 66 so as to form a substantial hemisphere between those points with the sectional area of buoy 56 increasing in planes substantially parallel to water line 66 and perpendicular to the swing of arm 58 from surface 64 to line 66 to be maximum at line 66. Buoy 56 continues upwardly from waterline 66 and is capped by an enlarged, flattened head portion 69 of a lopsided configuration having a greater height on a side spaced away from arm 58, and body 24. By this configuration, the weight of the buoy is effectively cancelled out when the buoy submerges in the water past the waterline 66, and inertia of the buoy 56 in transitions between downstroke and upstroke is reduced to prevent sluggish operation and to increase the response characteristics of the float assembly 28.

Boot rings 70 are provided on fulcrum pin 60 and arranged for sealingly receiving a cylindrical boot 72 which seals the area of the pivot joint between pin 60 and arm 58 against contamination from sabulous fluids, particulate matter, and the like. Gasketed end plates 73 similar to plates 511 assure a good seal. In a like manner, a boot ring 74 is provided at 29 so as to surround the opening 31 through which beam portion 75 of arm 58 enters body 24. A pair of circular plates 76, 76' are provided on the open framework portion of arm 58, and beam 75 joins, as by bolting, the framework portion of arm 58 to beam 75. Plates 76, 76' support, on their peripheries, a boot ring 77 to sealingly receive a cylindrical boot 78 which will permit arm 58 to swing while preventing seawater and other contaminants from entering body 24 while in its operational mode.

Linkage 62 comprises at least a pair of cables, one for the upstroke and one for the downstroke, and as illustrated in FIGS. 5 through 7, two cables for each stroke are preferred. Specifically, cables 80 are for the upstroke of beam 75, and cables 82 are for the downstroke. Brackets 84 are disposed adjacent an associated piston drive rod 34 and are provided with holes 86 which cooperate with tapered cable anchor wedges 88 to anchor one end of each cable 80 to the beam 75. The other end of each cable 80 is affixed to rod 34 by means of conventional cable clamps 92 fastened to screw threaded rods 93 which are in turn adjustably secured to an associated anchor bar 90, 90' pinned to rod 34. The downstroke cables 82 are similarly fastened to beam 75 and rod 34. Brackets 84 are formed in peripheral portions of a guide head 94 which terminates beam portion 75. Head 94 has a face in which curved grooves 96 and 98 are provided for receiving cables 80 and 82 respectively, and a groove 100 is provided for receiving rod 34.

As can be appreciated, when beam portion 75 moves upwardly, cables 80 will lift rod 34 upwardly, and when beam portion 75 moves downwardly, cables 82 will likewise force rod 34 downwardly. Grooves 96 and 98, as well as groove 100, are curved to maintain contact between the head 94 and the cables 80, 82 at all times during relative movement between head 94 and cables 80, 82. This arrangement permits a radial force path to be translated into a tagential in-line, or linear, force path without use of a rotating or sliding action about a connecting pin such as would be encountered with a Scotch Yoke, and the like.

Body 28 is provided with scuttle and resurrection solenoid valves 102 and 104, respectively, for permitting the device 10 to be scuttled and sunk to the ocean floor during storms, and the like, to prevent damage thereto. As shown schematically in FIG. 8, radio controlled scuttle valve 102 is disposed within the watertight chamber 51. The inlet side of valve 102 communicates with the supporting body of water by means of a pipe or the conduit 103 which extends through the bottom wall 106 of body 24 at 105. The outlet side of valve 102 communicates with the inside of body 24 by means of a conduit 107 having its discharge end 109 passing through the wall of chamber 51 at 51'. By opening valve 102 the interior of body 24 will be flooded to sink apparatus 10 by reducing the buoyancy thereof.

The resurrection valve 104 is likewise disposed in chamber 51 and permits a compressible fluid, such as air, to be used to blow out or purge the water from body 24 thus restoring the buoyancy of body 24 causing the device 10 to again rise to the surface. More specifically, and as will be described in more detail below, during normal operation of the device 10, compressed air is stored in the hollow buoys 56 until it is needed to force the water from body 24.

A check valve vent 108 located on a top section 106A of body 24 and a plurality of air pumps 110 (see FIG. 4) which are coupled thereto by means of air lines 111 draw outside air into a system used to pressurize the floats 56. One air pump 110 is preferably provided for each pumping system 30 and the several pumps are used to compress and feed air through a check valve 112 into a surge tank 114. The pumps 110 are located at the center of the four lower pumping units 32 and are actuated by piston rods 34 through a push rod 113 affixed to the lower end of each rod 34. (See FIG. 3) The compressed air is then passed from surge tank 114 through a check valve 116 and parallel hoses 118 to each of the buoys 56 for storage. Any suitable manifolding arrangement can be used to separate the flow into hoses 118.

A branch line 115 connected between check valve 116 and the hoses 118 connects the air stored in buoys 36 to the normally closed valve 104, which is disposed within the watertight chamber 51. Selective opening of valve 104 will let air flow from buoys 56 to the interior of body 24 in the exhaust outlet 117.

Provided in the bottom of hull 106 of body 24 is a sump 120 which under normal operation of the device 10, accumulates any water that may be present in body 24. Such accummulation is discharged through a pipe 121 and vent 122 disposed on top of body 24 (see FIG. 4) by pressure in body 24, as to be described below.

FIG. 9 schematically shows the electrical control network for the fluid system discussed above. A conventional battery 124 supplies electrical power for the system, and is kept in a charged state by a generator 126. A voltage regulator 128 connects generator 126 to battery 124. Generator 126 is energized by a fluid motor 130 (see FIG. 8) receiving air under pressure from surge tank 114 and exhausting same through a flap valve 132. The exhaust from motor 130 will create a positive pressure within body 24 which will force water in sump 120 through pipe 121 and vent 122.

An AM radio receiver 134 and an ULF (ultra low frequency) radio receiver 136 are provided for facilitating the remote actuation of valves 102 and 104, respectively. Communication is effected by means of a suitable antenna 119 (FIG. 3).

A timer 138 of conventional construction, such as a cam timer, connects a horn 140 (see FIG. 4), say, once per minute to battery 124 for a brief interval, while a light 142 disposed on top of element 28 (see FIG. 4) is connected directly to battery 124. A timer 144, preferably a conventional cam timer, cycles, for example, once every ten minutes to energize magnetic latches or other suitable valve control means 146 (see FIG. 3) disposed in chambers 52, directly above the check valves 48 for holding same open for a brief interval to backwash the screens in inlets 42 and 44 by the pressure generated by pistons 36.

Referring now to FIG. 10, a manifold system for coupling the plurality of pumping systems 10 (FIG. 1) is shown at 180 and includes several sections of large diameter conduit 182 having laterally extending inlet tabs 182 to which the discharge conduits 22 from the several pumping systems 10 are coupled. A reducer coupling 183 is provided at one end of the manifold unit for receiving the conduit 22 of one of the units 10.

A backflush valve assembly 156 is disposed in a downstream portion 154 of the discharge manifold system for permitting particulate accummulations to be flushed therefrom. Backflush assembly 156 is comprised of means forming a main conduit section 157 having a first side port 162 and a second side port 164 each arranged extend in opposite directions away from the section 154. Inflatable bladder valves 166 and 168 are disposed in the first port 162 and the second port 164, respectively, for selectively blocking and unblocking the associated discharge port. Valves 166 and 168 have lugs 170 and 172 extending therefrom, respectively, to which are attached cables 174 and 176 are attached to respective lugs 178 and 180 extending inwardly from the wall of section 154 in order to hold valves 166 and 168 in captive position in port 162 and 164. The bladder values are inflated or deflated via a tube or tubes 184 which extends through the manifold 180 and effluent conduit 22 of one of the pumping systems 10, the bottom and sump portions of which are shown at 185.

FIG. 11 shows a control circuit for the backflush valve assembly 156, and will be discussed in conjunction with FIGS. 8 and 9. A line 188 feeds compressed air from tank 114 (FIG. 8) into a spool valve 190 which is electrically actuated by a coil 192 and pneumatically returned by means of a bleed line 196. Once coil 192 has been energized, in a manner to be described below, a path through valve 190 will be opened from surge tank 114 through a pressure regulated valve 194 to a line 195, one end of which is connected to line 184 and the valves 166 and 168 (FIG. 10). Some of the fluid pressure will be bled through a bleed line 196 and back to valve 190 in order to move valve 190 back to the left, coil 92 having been deenergized at this point, so that the fluid flow is now directed to air motor 130 (FIG. 9). The system is now in a normal operating mode. To assure that valve elements 166, 168 stay inflated despite any leakage that may be present, fluid pressure is continuously fed to line 184 through a pressure regulator 198 set lower than regulator 194. To protect the valve bladders 166, 168 against over inflation, a pressure relief valve 200 is provided between regulators 194 and 198 as a safety measure. Pressure controlled valve 202 is provided to prevent air from entering line 188 until the required pressure is attained in flats 56.

The deflate bladder valves 166 and 168, a normally closed solenoid valve 206 is placed in line 195. When valve 206 is opened as will be further described below, pressure in valve elements 166, 168 will be vented through lines 184 and 195 and valve 206 thereby deflating them and opening the ports 162 and 164 to permit backwashing of the conduit 12 (FIG. 1) leading to the shore.

With reference again to FIG. 10, once valve elements 166 and 168 are deflated, it will be appeciated that flow from the several pumping systems 10 will enter through the section 154 of the manifold system and will be discharged out of port 162. At the same time, flow from downstream of the valve assembly 156 will reverse its direction and exit via port 164 provided the water downstream is at a higher head than that of the water in which manifold 54 is submerged. This generally will be the case when the liquid is being pumped to a reservoir elevated above the body of liquid being pumped. Thus, sand and other particulate matter accumulation will be expelled from the discharge line. The brief interruption in flow is not normally of consequence to the overall operation of the system.

Referring again to FIG. 11, the operation of valves 190 and 206 can be controlled by a suitable stepping motor 208 having a rotating contact 210 which can make, for example, one revolution every one hundred hours. This time can of course vary to suit a particular application. During each revolution, contact closure arm 210 will engage and close switches 212 and 214 in order to cause the associated valves 206 and 190 to be actuated.

When contact 210 is in position A, it will close the normally open switch 214 and complete a circuit from the battery 124 to solenoid valve 206 and open the latter to deflate valve elements 166, 168. When contact 210 reaches position B, switch 212 will be closed and switch 214 will be opened, thus completing an energizing circuit through coil 192 starting the cycle described above. This will inflate bladder valves 166 and 168 and place the system in normal operation.

From the above description, it will thus be appreciated that once installed, the surface will be self-operating and will cause water to be pumped into reservoir 16 at a rate determined by the magnitude of of the wave activity. It will furthermore be understood that in the event the wave or wind activity should excede a critical predetermined level, a scuttling signal can be transmitted from a remotely located transmitter causing the devices 10 to be flooded and sink to the bottom until the storm conditions have subsided. Thereafter, a low frequency transmission from the remote location can be generated which when received by each device 10 will cause that device to close its scuttling valve 102 and open the resurrection valve 104. The opening of valve 104 will cause the pressurized air stored in floats 56 to be discharged into body 24 causing water contained therein to be forced out of the body via sump line 121. Accordingly, as the buoyancy of each deivce 10 exceeds the weight thereof the respective devices will slowly rise to the surface and resume their intended pumping operation.

While the invention has been particularly shown and described with reference to certain preferred embodiments, it will be understood by those skilled in the art that various alterations and modificatios in form and detail may be made therein. Accordingly, it is intended that the following claims cover all such alterations and modifications as fall within the true spirit and scope of the invention.

What is claimed is:

1. A wave motion powered pump apparatus, comprising:
    a buoyant main body for disposition on the surface of a liquid having surface wave motion;
    liquid inlet means and liquid effluent means;
    pump means disposed within said buoyant body and operative to cause liquid to be allowed to flow into said inlet means and to be discharged under pressure through said effluent means;
    float means connected to said pump means and operative to actuate said pump means as a function of the differential motion created in said float means and said body by said surface wave motion; and
    means for causing said main body and float means to submerge as a single unit below said surface and for raising the submerged unit back to said surface, at will, whereby to serve as a way of protecting said unit underwater during periods of heavy turbulence at the surface thereof, said submerging and raising means including means for controllably decreasing the buoyancy of the combination of said main body and said float means sufficient to cause the entire combination to submerge and for increasing the buoyancy of said combination sufficient to cause the latter to return to said surface, said main body and said float means including internal cavities and said buoyancy decreasing and increasing means including means for allowing water from said body of water to enter at least one of said cavities, means for storing a compressed fluid within at least one of said cavities and means for purging said water-containing cavity of said water using said compressed fluid to do so.

2. A wave motion powered pump apparatus as recited in claim 1, wherein said pump means includes at least one double acting reciprocating pump having a drive rod coupled to said float means for being reciprocated thereby and a pair of opposed pistons attached to said rod for reciprocating movement therewith, said pump means further including a pair of spaced headers each having an inlet and an outlet, each said header being in communication with one of said opposed pistons and said inlet means and said effluent means and check valve means disposed at the inlet effluent sides of said headers such that upon movement of said pistons in a header volume expanding direction liquid is drawn through said inlet means into said header and upon movement of said pistons in a volume compression direction liquid disposed within said headers is forced out of said body through said effluent means.

3. A wave motion powered pump apparatus as recited in claim 2 wherein said effluent means further includes a discharge manifold means disposed within said buoyant body and connected to said headers for receiving liquid flowing from said pumps and directing liquid so received into a common outlet conduit.

4. A wave motion powered pump apparatus as recited in claim 3 wherein pump means includes a plurality of double acting pumps, each of said pumps including an associated pair of headers connected to said discharge manifold means.

5. A wave motion powered pump apparatus as recited in claim 4 wherein each of said double acting pumps includes a plurality of coexistensive opposed pistons arranged in parallel and connected to the associated rod of the pump for being reciprocated thereby.

6. A wave motion powered pump apparatus as recited in claim 4 wherein said float means includes:
   an elongated arm pivotally attached to said body at a point along its length and adapted for pivotal movement about an axis normally disposed in a substantially horizontal plane;
   a buoy attached to one end of said arm and adapted to move up and down with wave action thereby causing said pivotal movement of said arm; and
   linkage means attached to said arm at its other end and connected to said pump means in such a measure that said pivotal movement causes actuation of said pump means.

7. A wave motion powered pump apparatus as recited in claim 6 wherein said buoy is weighted so as to have a downward force when unlifted that is substantially equal to the upward force exerted by said wave action, said buoy having a bottom surface and a normal water line, the cross sectional area of said buoy taken in planes parallel to said waterline increasing from said bottom surface to said waterline and having an enlarged head arranged above the water for effectively cancelling out the weight of said buoy when said buoy submerges past said water line thereby quickly reducing the inertia of said buoy between its downstroke and upstroke movement.

8. An apparatus according to claim 1 wherein said water-containing cavity is in said main body, wherein said cavity containing compressed fluid is in said float means, and wherein said purging means includes means for providing a supply of air under pressure within said one other cavity in said float means, means for directing said air under pressure into the cavity of said main body and valve means responsive to said air for allowing the latter to force the water in said main body cavity out of the latter through said valve means.

9. A wave motion powered pump apparatus as recited in claim 6 wherein said pump means includes a plurality of said double acting pumps and wherein said float assembly includes a plurality of identical buoy and arm assemblies each operatively associated with one of said pumps.

10. A wave motion powered pump apparatus as recited in claim 9 wherein said arms extend in radial directions away from the center of said body for creating an omni-directional capability which will function in cross waves, shore aligned waves, swells and turbulent sea surface.

11. Apparatus as defined in claim 10 wherein the buoyant body forms a hollow cavity serving as said water-containing cavity and includes scuttle and resurrection means serving as said submerging and raising means for permitting said buoyant body to be sunk in an associated body of liquid when excess and potentially damaging turbulence is expected in and around said buoyant body, and comprising scuttle valve means for flooding said cavity of the buoyant body with liquid from an associated body of liquid, and compressible fluid resurrection means including a fluid pump operated in conjunction with the liquid pumps and arranged for storing compressed fluid in said buoys of said float means for permitting relative purging of liquid from the cavity of the buoyant body after same has been sunk.

12. Apparatus as defined in claim 11 wherein the discharge manifold means includes a first portion disposed within the cavity of said buoyant body and a second portion arranged extending from said buoyant body for transporting the liquid to a point remote of said buoyant body for utilization, a backflush valve means disposed in the second portion of the discharge manifold means for permitting particulate accummulations to be flushed from the second portion, and actuator means running through the second portion from said buoyant body to said backflush valve means for controlling operation of said backflush valve means.

13. Apparatus as recited in claim 12 wherein said backflush valve means comprises a first port housing and a second port housing each arranged extending in opposite directions away from the second portion of said discharge manifold means, inflatable bladder valve element means disposed in the first port housing and second port housing for selective blocking and unblocking of the associated port housing, said actuator means including a fluid line connected to the valve element means and connectable to a source of compressible fluid under pressure for inflating and deflating said valve element means and permitting selective backflushing of the second portion of said discharge manifold means.

14. Apparatus as recited in claim 1 wherein the float means includes a float assembly comprising:
   a buoy;
   an arm attached to said buoy and pivotally mounted on said buoyant body at a point spaced from the buoy for pivoted movement about an axis normally disposed in a substantially horizontal plane; and
   leverage means attached to the arm at a point spaced from both the point of mounting of the arm on said buoyant body and from said buoy, and connected to said pump means for permitting a vertical swinging motion of the arm and buoy to actuate said pump means.

15. Apparatus as recited in claim 14 wherein said buoy is weighted so as to have a downward force substantially equal to the upward force exerted by a liquid being pumped, said buoy having a bottom surface and a normal waterline, and the sectional area of the buoy increasing from the bottom surface to the waterline in planes substantially perpendicular to the swing of the arm on which the buoy is mounted and capped by an enlarged head configured for effectively cancelling out the weight of said buoy when the buoy submerges in the liquid past the waterline and reducing inertia of said buoy between downstrokes and upstrokes.

16. A wave motion powered pump apparatus as recited in claim 1, wherein said means for storing a compressed fluid within at least one of said cavities includes secondary pump means connected with said float means and driven by energy resulting from said differential motion created in said flat means and said body by said surface wave motion during normal operation of said apparatus for initially providing said compressed fluid within at least one of said cavities whereby the stored compressed fluid can be used for purging purposes when the overall unit is submerged and no differential motion is present.

17. A wave motion powered pump apparatus, comprising:
   a buoyant main body for disposition in a liquid having surface wave motion;
   liquid inlet means and liquid effluent means;
   pump means disposed within said buoyant body and operative to cause liquid to be allowed to flow into said inlet means and to be discharged under pressure through said effluent means, said pump means including a discharge manifold means associated with said buoyant body for receiving a liquid flow and directing same along a common path, said discharge manifold means including a backflush valve means disposed along the common path of said discharge manifold means for permitting particulate accumulations to be flushed from said discharge manifold means, and actuator means running through the discharge manifold means from said buoyant body for controlling operation of said backflush valve means; and float means connected to said pump means and operative to actuate said pump means as a function of the differential motion created in said float means and said body by said surface wave motion.

18. Apparatus as recited in claim 17 wherein said backflush valve means comprises a first port housing and a second port housing each arranged extending in opposite directions from the common path of said discharge manifold means, inflatable bladder valve element means disposed in the firt port housing and second port housing for selective blocking and unblocking of the associated port housing, said actuator means including a fluid line connected to the valve element means and connectible to a source of compressible fluid under pressure for selectively inflating and deflting said valve element means.

19. A wave motion powered pump apparatus, comprising:

a buoyant main body for disposition in a liquid having surface wave motion;

liquid inlet means and liquid effluent means;

pump means disposed within said buoyant body and operative to cause liquid to be allowed to flow into said inlet means and to be discharged under pressure through said effluent means;

float means connected to said pump means and operative to actuate said pump means as a function of the differential motion created in said float means and said body by said surface wave motion; and said body including scuttle and resurrection means for permitting said buoyant body to be sunk in an associated body of liquid when excess and potentially damaging turbulence is expected in and around said buoyant body, and comprising scuttle valve means for eliminating buoyancy of said buoyant body by admitting liquid from an associated body of liquid into said buoyant body and compressible fluid resurrection means including a fluid pump operated in conjunction with said pump means and arranged for storing compressed fluid in said float means, which fluid can be released selectively to purge liquid from said buoyant body and permit same to raise in an associated body of liquid after having been scuttled.

20. A wave motion powered pump apparatus, comprising:

a buoyant main body for disposition in a liquid having surface wave motion;

liquid inlet means and liquid effluent means;

pump means disposed within said buoyant body and operative to cause liquid to be allowed to flow into said inlet means and to be discharged under pressure through said effluent means;

buoyant float means connected to said pump means and operative to actuate said pump means as a function of the differential motion created in said float means and said body by said surface wave motion; and scuttle and resurrection means for permitting said buoyant body and float means to be sunk as a single unit in an associated body of liquid when excess and potentially damaging turbulence is expected in and around said buoyant body, said scuttle and resurrection means including scuttle valve means for eliminating buoyancy of said unit by admitting liquid from said associated body of liquid into an internal cavity defined by said unit sufficient to sink the latter and compressible fluid resurrection means including compressed fluid stored in said unit and means for releasing said fluid selectively to purge liquid from said unit and permit the latter to raise in said associated body of liquid after having been scuttled.

21. A wave motion powered apparatus as recited in claim 20 including secondary pump means connected with said float means and driven by energy resulting from said differential motion created in said float means and said body during normal operation of said apparatus for initially producing said compressed fluid stored in said unit, whereby the stored compressed fluid can be used for purging purposes when the overall unit is submerged and no differential motion is present.

22. A wave motion powered pump apparatus, comprising:

a buoyant main body for disposition in a liquid having surface wave motion;

liquid inlet means and liquid effluent means;

pump means disposed within said buoyant body and operative to cause liquid to be drawn into said inlet means and to be discharged under pressure through said effluent means; and float means connected to said pump means and operative to actuate said pump means as a function of the differential motion created in said float means and said body by said surface wave motion, said pump means including at least one double acting reciprocating pump having a drive rod coupled to said float means for being reciprocated thereby and a pair of opposed pistons attached to said rod for reciprocating movement therewith, said pump means further including a pair of spaced headers each having an inlet and an outlet, each said header being in communication with one of said opposed pistons and said inlet means and said effluent means and check valve means disposed at the inlet effluent sides of said headers such that upon movement of said pistons in a header volume expanding direction liquid is drawn through said inlet means into said header and upon movement of said pistons in a volume compression direction liquid disposed within said headers is forced out of said body through said effluent means, said effluent means further including a discharge manifold means disposed within said buoyant body and connected to said headers for receiving liquid flowing from said pumps and directing liquid so received into a common outlet conduit, said pump means further including a plurality of double acting pumps, each of said pumps including an associated pair of headers connected to said discharge manifold means, said float means including an elongated arm pivotally attached to said body at a point along its length and adapted for pivotal movement about an axis normally disposed in a substantially horizontal plane, a buoy attached to one end of said arm and adapted to move up and down with wave action thereby causing said pivotal movement of said arm, and linkage means attached to said arm at its other end and connected to said pump means in such a manner that said pivotal movement causes actuation of said pump means, said linkage means including at least a pair of cables the ends of which are affixed to said other end of said arm and said rod in such a manner as to drive said rod up and down as said arm experiences said pivotal movement.

* * * * *